(12) United States Patent
Ueno et al.

(10) Patent No.: US 11,648,987 B2
(45) Date of Patent: May 16, 2023

(54) RESIN ROOF

(71) Applicant: TOYOTA JIDOSHA KABUSHIKI KAISHA, Toyota Aichi-ken (JP)

(72) Inventors: Kouichirou Ueno, Nagoya Aichi-ken (JP); Taichi Minei, Toyota Aichi-ken (JP); Masaro Kimba, Toyota Aichi-ken (JP)

(73) Assignee: TOYOTA JIDOSHA KABUSHIKI KAISHA, Toyota Aichi-ken (JP)

(*) Notice: Subject to any disclaimer, the term of this patent is extended or adjusted under 35 U.S.C. 154(b) by 16 days.

(21) Appl. No.: 17/555,972

(22) Filed: Dec. 20, 2021

(65) Prior Publication Data
US 2022/0204090 A1    Jun. 30, 2022

(30) Foreign Application Priority Data

Dec. 25, 2020  (JP) .............................. JP2020-217813

(51) Int. Cl.
  *B62D 25/06*  (2006.01)
  *B62D 27/02*  (2006.01)
  *B62D 29/04*  (2006.01)

(52) U.S. Cl.
  CPC ........... *B62D 25/06* (2013.01); *B62D 27/026* (2013.01); *B62D 29/043* (2013.01)

(58) Field of Classification Search
  CPC .... B62D 25/06; B62D 27/026; B62D 27/023; B62D 29/043
  USPC ... 296/210, 215, 29, 203.01, 203.03, 901.01
  See application file for complete search history.

(56) References Cited

FOREIGN PATENT DOCUMENTS

| JP | 2002-235853 A | 8/2002 |
| JP | 2011-225150 A | 11/2011 |
| JP | 2018-119570 A | 8/2018 |

*Primary Examiner* — Dennis H Pedder
(74) *Attorney, Agent, or Firm* — Dinsmore & Shohl LLP

(57) ABSTRACT

A resin roof is provided with a roof main body including an outer layer and an inner layer. The outer layer structures a roof panel of a vehicle. The inner layer is provided in a predetermined region that excludes a peripheral edge portion of the outer layer. A first joining portion is provided at the peripheral edge portion of the outer layer and is joined by a first adhesive to a first joined portion that is provided at a vehicle body side first base member. A second joining portion is provided at the inner layer and is joined by a second adhesive to a second joined portion that is provided at a vehicle body side second base member. One of the first adhesive or the second adhesive is configured with higher adaptability than another of the first adhesive or the second adhesive.

6 Claims, 5 Drawing Sheets

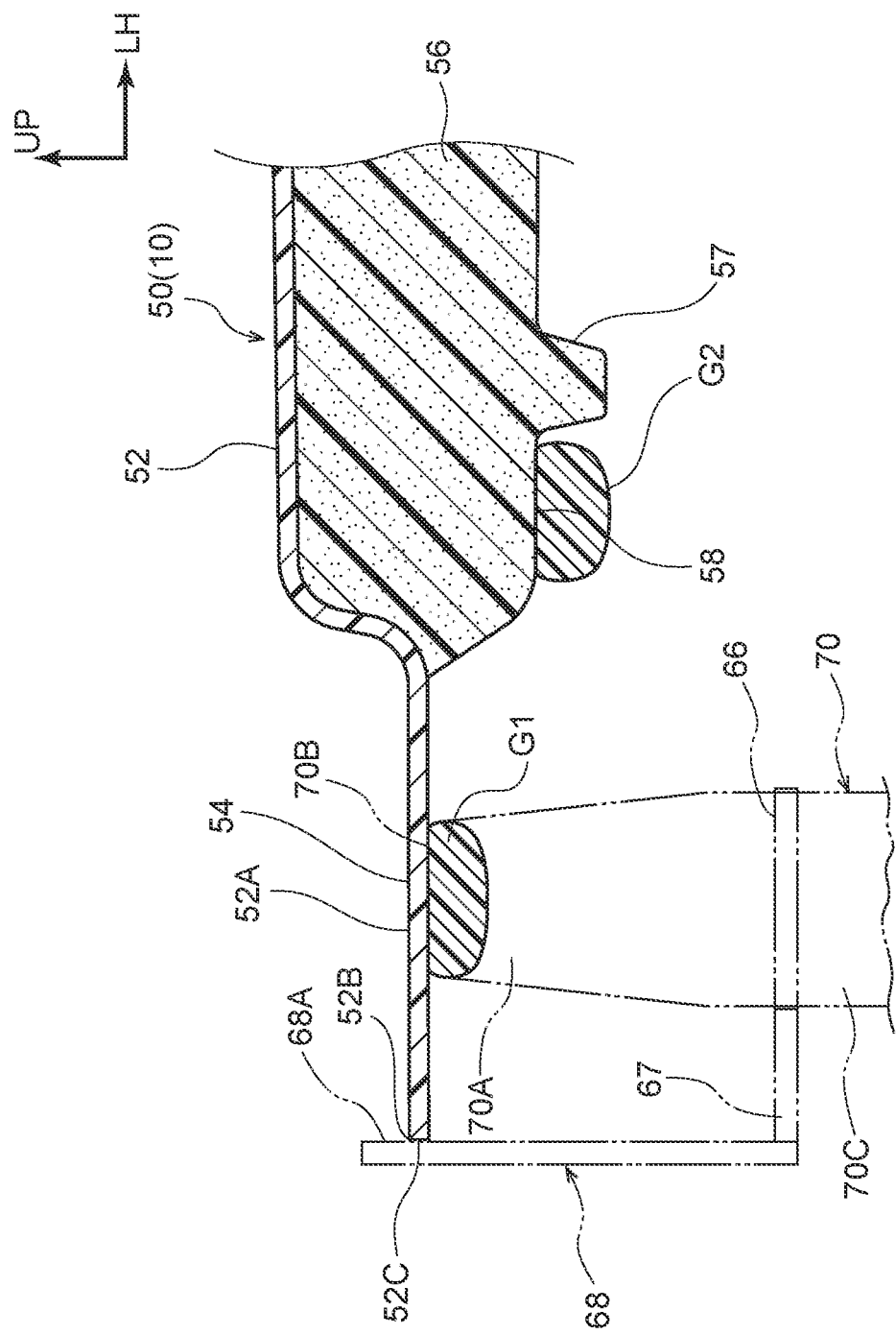

RESIN ROOF

CROSS-REFERENCE TO RELATED APPLICATION

This application is based on and claims priority under 35 USC 119 from Japanese Patent Application No. 2020-217813 filed on Dec. 25, 2020, the disclosure of which is incorporated by reference herein.

BACKGROUND

Technical Field

The present disclosure relates to a resin roof.

Related Art

A ceiling interior trim for a vehicle has been known since heretofore (for example, see Japanese Patent Application Laid-Open (JP-A) No. 2011-225150) in which a molded foam body is formed integrally at a vehicle cabin outer side of a panel-shaped base member that is disposed to so as to face the vehicle cabin interior, at the vehicle cabin inner side of a roof panel of the vehicle. The shape of the vehicle cabin outer side of the molded foam body is substantially the same as the shape of the vehicle cabin inner side of the roof panel. The molded foam body is attached to the roof panel in a state in which the vehicle cabin outer side of the molded foam body is pressed against the vehicle cabin inner side of the roof panel.

When an inner layer fabricated of resin such as a molded foam body or the like is provided between a roof panel of a vehicle and a base member provided at the vehicle cabin inner side of the roof panel, as described above, and this inner layer is provided at an outer layer fabricated of resin that structures the roof panel, a roof main body including the outer layer and the inner layer may be assembled to a vehicle body side base member. However, in a roof main body with this structure, a difference in coefficients of thermal expansion between the outer layer and the inner layer may cause thermal strain to occur. There is scope for improvement in structures that suppress the occurrence of thermal strain.

SUMMARY

Accordingly, an object of the present disclosure is to provide a resin roof that, in a roof main body that includes an outer layer and an inner layer, may suppress an occurrence of thermal warping caused by a difference between coefficients of thermal expansion of the outer layer and the inner layer.

In order to achieve the object described above, a resin roof according to a first aspect of the present disclosure includes: a roof main body including: an outer layer fabricated of resin, the outer layer structuring a roof panel of a vehicle, and an inner layer fabricated of resin, the inner layer being provided in a predetermined region that excludes a peripheral edge portion of the outer layer; a first joining portion provided at the peripheral edge portion of the outer layer, the first joining portion being joined by a first adhesive to a first joint portion that is provided at a vehicle body side first base member; and a second joining portion provided at the inner layer, the second joining portion being joined by a second adhesive to a second joint portion that is provided at a vehicle body side second base member, wherein one of the first adhesive or the second adhesive, which corresponds to whichever of the outer layer and the inner layer has a higher coefficient of thermal expansion, is configured with higher adaptability than another of the first adhesive or the second adhesive.

According to the first aspect of the present disclosure, the inner layer fabricated of resin is provided in the predetermined region that excludes the peripheral edge portion of the outer layer fabricated of resin that structures the roof panel of the vehicle. The first joining portion, which is joined by the first adhesive to the first joined portion provided at the vehicle body side first base member, is provided at the peripheral edge portion of the outer layer. The second joining portion, which is joined by the second adhesive to the second joined portion provided at the vehicle body side second base member, is provided at the inner layer. One of the first adhesive and the second adhesive, according to whichever of the outer layer and the inner layer has the higher coefficient of thermal expansion, is constituted so as to be higher in adaptability than the other of the first adhesive and the second adhesive. Therefore, even when one of the outer layer and the inner layer moves so as to shift relative to the other of the outer layer and the inner layer because of the difference in the coefficients of thermal expansion of the outer layer and the inner layer, this movement is tolerated by the first adhesive or the second adhesive. Thus, the occurrence of thermal strain in the roof main body is suppressed. As a constitution that raises adaptability, varying the thickness of the adhesive, changing properties of the adhesive itself, and the like can be considered.

In a resin roof according to a second aspect of the present disclosure, in the resin roof according to the first aspect, a thickness of the one of the first adhesive or the second adhesive that corresponds to the whichever of the outer layer and the inner layer has a higher coefficient of thermal expansion is equal to or greater than a thickness of the other of the first adhesive or the second adhesive.

According to the second aspect of the present disclosure, the thickness of the one of the first adhesive and the second adhesive that corresponds to whichever of the outer layer and the inner layer has the higher coefficient of thermal expansion is equal to or greater than the thickness of the other of the first adhesive and the second adhesive. Therefore, even when one of the outer layer and the inner layer moves so as to shift relative to the other of the outer layer and the inner layer because of the difference in the coefficients of thermal expansion of the outer layer and the inner layer, this movement is tolerated by the first adhesive or the second adhesive more effectively than if the thickness of the one of the first adhesive and the second adhesive was less than the thickness of the other of the first adhesive and the second adhesive. Thus, the occurrence of thermal strain in the roof main body is suppressed more effectively.

In a resin roof according to a third aspect of the present disclosure, in the resin roof according to the second aspect, a protrusion portion is formed at the inner layer, the protrusion portion abutting against the second joint portion.

According to the third aspect of the present disclosure, the protrusion portion that abuts against the second joined portion is formed at the inner layer. As a result, the thickness of the second adhesive provided at the second joining portion of the inner layer is regulated to be constant.

In a resin roof according to a fourth aspect of the present disclosure, in the resin roof according to any one of the first to third aspects, a step portion is formed at the outer layer between the first joining portion and the second joining portion.

According to the fourth aspect of the present disclosure, the step portion is formed at the outer layer, between the first joining portion and the second joining portion. Hence, even when one of the outer layer and the inner layer moves so as to shift relative to the other of the outer layer and the inner layer because of the difference in the coefficients of thermal expansion of the outer layer and the inner layer, this movement is tolerated by deformation of the step portion more effectively than if the step portion was not formed at the outer layer between the first joining portion and the second joining portion. Thus, the occurrence of thermal strain in the roof main body is suppressed more effectively.

In a resin roof according to a fifth aspect of the present disclosure, in the resin roof according to any one of the first to fourth aspects, the inner layer is formed thicker than the outer layer.

According to the fifth aspect of the present disclosure, because the inner layer is formed to be thicker than the outer layer, intrusion of noise into a vehicle cabin is suppressed by the inner layer and thermal insulation effects are improved.

In a resin roof according to a sixth aspect of the present disclosure, in the resin roof according to any one of the first to fifth aspects, an outer edge of the peripheral edge portion of the outer layer and the first base member are sealed together.

According to the sixth aspect of the present disclosure, a gap between the outer edge of the peripheral edge portion of the outer layer and the first base member is sealed up. Therefore, ingression of water into the vehicle cabin between the outer edge and the first base member is prevented.

According to the present disclosure as described above, in a resin roof provided with a roof main body that includes an outer layer and an inner layer, the occurrence of thermal strain caused by a difference between coefficients of thermal expansion of the outer layer and the inner layer may be suppressed.

BRIEF DESCRIPTION OF THE DRAWINGS

Exemplary embodiments of the present disclosure will be described in detail based on the following figures, wherein:

FIG. 5 is a sectional diagram, corresponding to FIG. 2, illustrating a method of providing a first adhesive at an outer layer of the resin roof according to the present exemplary embodiment.

DETAILED DESCRIPTION

Figure 1:
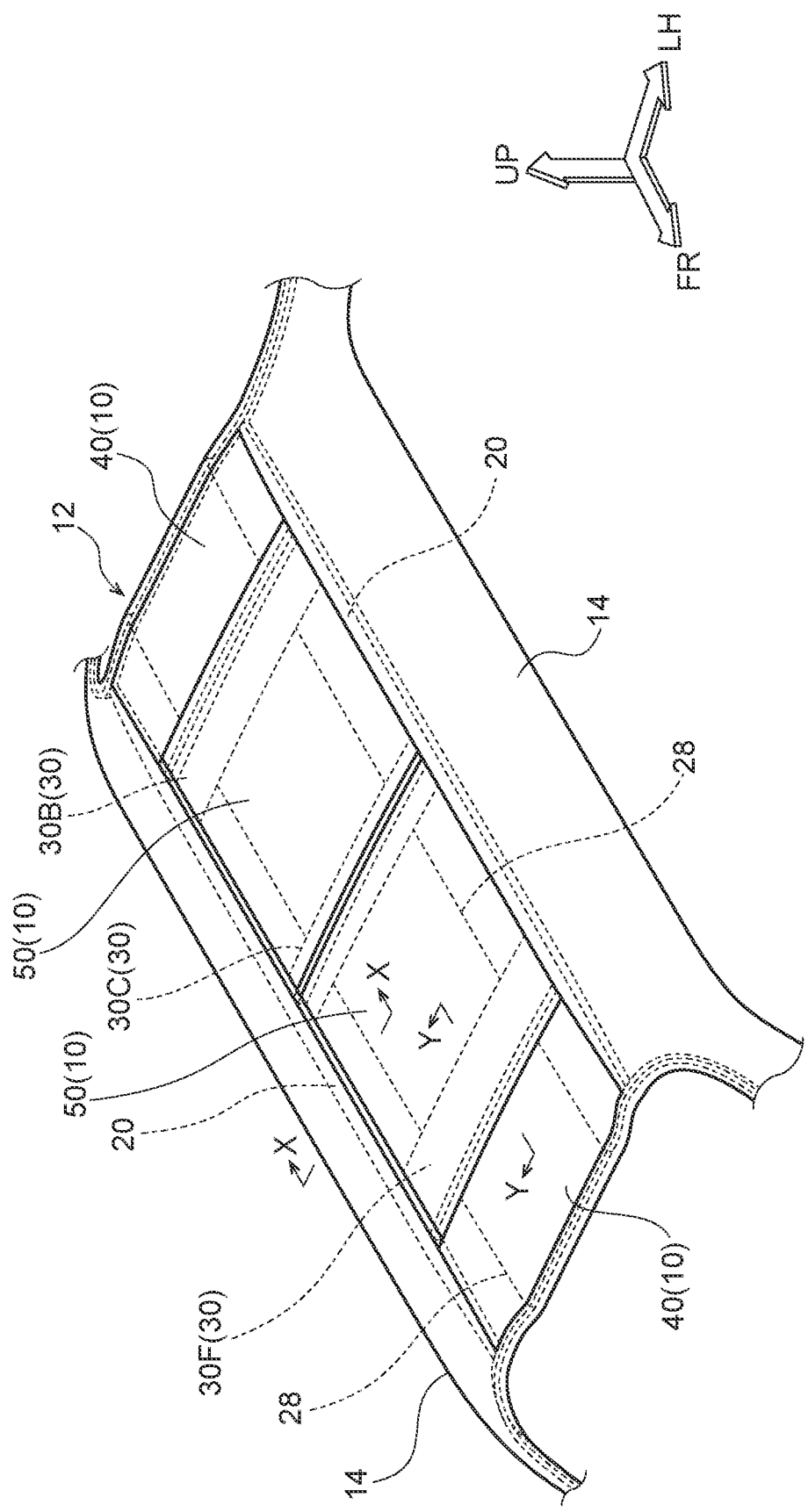
FIG. 1 is a perspective view showing a resin roof according to a present exemplary embodiment.

Below, an exemplary embodiment relating to the present disclosure is described in detail in accordance with the drawings. For convenience of description, the arrow UP that is shown where appropriate in the drawings indicates a vehicle upper direction, the arrow FR indicates a vehicle front direction, and the arrow LH indicates a vehicle left direction. Thus, in the following descriptions, where the directions upper and lower, front and rear, and left and right are recited without being particularly specified, the same represent upper and lower in the vehicle vertical direction, front and rear in the vehicle front-and-rear direction, and left and right in the vehicle left-and-right direction (the vehicle width direction).

Figure 2:
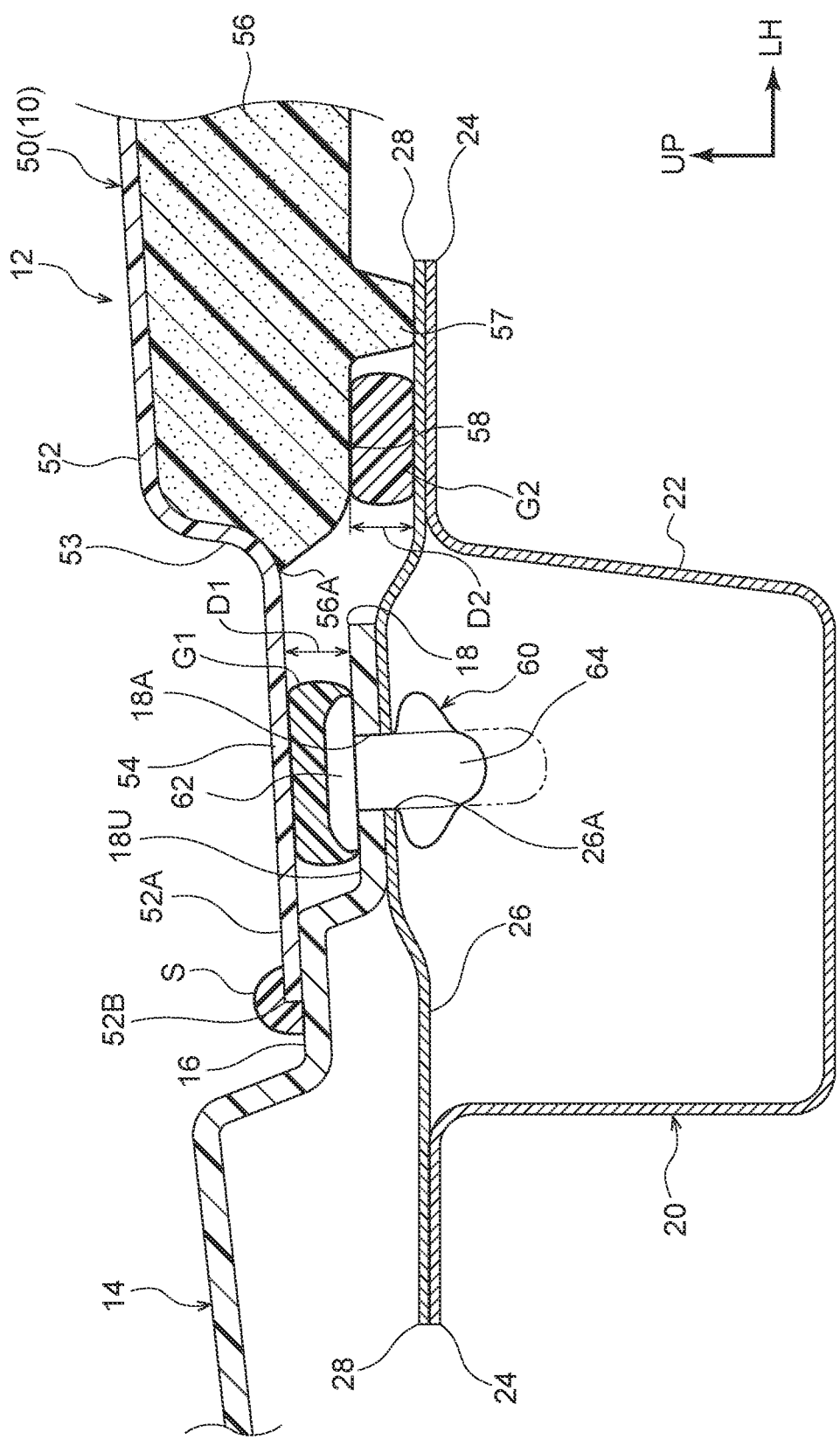
FIG. 2 is a sectional diagram cut along line X-X in FIG. 1, showing the resin roof according to the present exemplary embodiment.

As shown in FIG. 1 and FIG. 2, a left and right pair of roof side rails 20 fabricated of metal that extend in the front-and-rear direction are provided at two vehicle width direction end portions of a roof 12 of a vehicle according to the present exemplary embodiment. Each roof side rail 20 is formed in a chamber shape by an under reinforcement 22 and an upper reinforcement 26 being joined to one another. In a sectional view seen in the vehicle front-and-rear direction, the under reinforcement 22 is formed substantially in a hat shape. In the sectional view seen in the vehicle front-and-rear direction, the upper reinforcement 26 is formed substantially in a flat plate shape.

That is, the roof side rail 20 is formed in the chamber shape by flange portions 24 of the under reinforcement 22 and flange portions 28 of the upper reinforcement 26 being joined to one another by spot welding or the like. The flange portions 24 are formed at a vehicle width direction inner side end portion and a vehicle width direction outer side end portion of the under reinforcement 22. The flange portions 28 are formed at a vehicle width direction inner side end portion and a vehicle width direction outer side end portion of the upper reinforcement 26. Penetrating holes 26A with circular shapes are formed at plural predetermined positions of the upper reinforcement 26 that extends in the front-and-rear direction.

A vehicle width direction inner side end portion of a side member outer panel (below referred to as "the side member outer") 14 is joined to the upper face of the upper reinforcement 26. To describe this more specifically, a step portion 16 is integrally formed at the vehicle width direction inner side of the side member outer 14. In the sectional view seen in the vehicle front-and-rear direction, the step portion 16 is inflected in a substantial "L" shape toward the lower side. A support portion 18 is integrally formed at a vehicle width direction inner side end portion of the step portion 16. In the sectional view seen in the vehicle front-and-rear direction, the support portion 18 is inflected in a substantial "L" shape toward the lower side.

Penetrating holes 18A with circular shapes are formed at plural predetermined positions of the support portion 18 that extends in the front-and-rear direction. The penetrating holes 18A are in communication with the penetrating holes 26A of the upper reinforcement 26. Thus, the support portion 18 that is the vehicle width direction inner side end portion of the side member outer 14 is attached to the upper reinforcement 26 (the roof side rail 20) by shaft portions 64 of plural rivets 60 being inserted into the penetrating holes 18A and the penetrating holes 26A from the vehicle upper side and being crimped (being deformed from the shape depicted with virtual lines to the shape depicted with solid lines).

As shown in FIG. 1, three roof reinforcements 30 that are spaced apart in the front-and-rear direction are provided extending in the vehicle width direction between the left and right pair of roof side rails 20. The roof reinforcements 30 are fabricated of metal and serve as vehicle body side second base members. Below, the roof reinforcement 30 at the front side is referred to as the roof reinforcement 30F, the roof reinforcement 30 at the middle side is referred to as the roof reinforcement 30C, and the roof reinforcement 30 at the rear side is referred to as the roof reinforcement 30B.

A front and rear pair of sub-roofs 40 fabricated of resin structure a roof panel of the roof 12. In a plan view, the sub-roofs 40 are provided, respectively, in a region bounded by the roof reinforcement 30F at the front side and the left and right pair of roof side rails 20 and in a region bounded by the roof reinforcement 30B at the rear side and the left and right pair of roof side rails 20. The sub-roofs 40, which are provided in advance between the left and right pair of roof side rails 20, also serve as vehicle body side first base members.

Two main roofs 50 that serve as roof main bodies are arrayed at front and rear. In plan view, the main roofs 50 are provided, respectively, in a region bounded by the roof reinforcement 30F at the front side (the sub-roof 40 at the front side), the roof reinforcement 30C at the middle side, and the left and right pair of roof side rails 20 and in a region bounded by the roof reinforcement 30B at the rear side (the sub-roof 40 at the rear side), the roof reinforcement 30C at the middle side, and the left and right pair of roof side rails 20. The main roofs 50 are described below.

The front and rear pair of sub-roofs 40 are formed in substantially rectangular flat plate shapes of a resin material with high strength and stiffness, such as glass fiber-reinforced plastic (GFRP) or the like. Plate thicknesses of the sub-roofs 40 are set to 2.0 mm or more. The front and rear pair of sub-roofs 40 support, respectively, an upper end portion of a front windshield glass (not shown in the drawings) and an upper end portion of a rear windshield glass (not shown in the drawings).

That is, the front and rear pair of sub-roofs 40 are formed of a resin material such as GFRP or the like with strength and stiffness high enough to enable support of, respectively, the upper end portion of the front windshield glass and the upper end portion of the rear windshield glass. The front and rear pair of sub-roofs 40 have similar structures. Accordingly, only the sub-roof 40 at the front side is described below.

Figure 3:
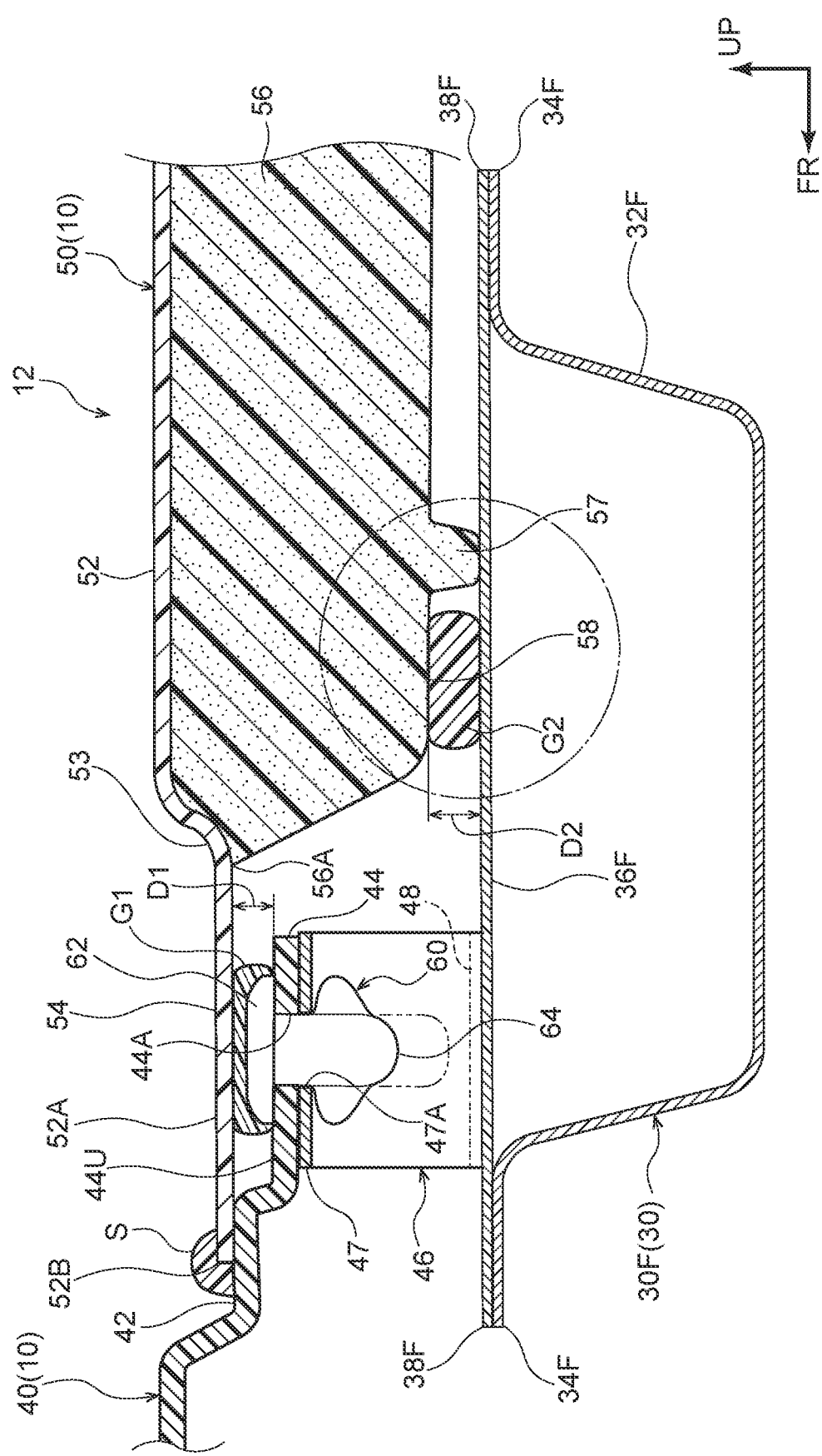
FIG. 3 is a sectional diagram cut along line Y-Y in FIG. 1, showing the resin roof according to the present exemplary embodiment.

As shown in FIG. 3, a step portion 42 is integrally formed at a rear portion of the sub-roof 40 at the front side. In a sectional view seen in the vehicle width direction, the step portion 42 is inflected toward the lower side in a substantial "L" shape. A support portion 44 is integrally formed at a rear end portion of the step portion 42. In the sectional view seen in the vehicle width direction, the support portion 44 is inflected toward the lower side in a substantial "L" shape.

The support portion 44 of the sub-roof 40 extends in the vehicle width direction. The support portion 44 serves as a single first joined portion to which a first joining portion 54, which is described below, is joined. An upper face 44U of the support portion 44 serves as a single first joined portion that a first adhesive G1, which is described below, contacts.

The roof reinforcement 30F at the front side is formed in a chamber shape by an under reinforcement 32F and an upper reinforcement 36F being joined to one another. The under reinforcement 32F is formed substantially in a hat shape in the sectional view seen in the vehicle width direction. The upper reinforcement 36F is formed substantially in a flat plate shape in the sectional view seen in the vehicle width direction.

That is, the roof reinforcement 30F at the front side is formed into the chamber shape by flange portions 34F formed at a front end portion and rear end portion of the under reinforcement 32F and flange portions 38F formed at a front end portion and rear end portion of the upper reinforcement 36F being joined to one another by spot welding or the like.

A plural number of brackets 46 are integrally attached to the upper face at the front side of the upper reinforcement 36F. In a sectional view seen in the vehicle front-and-rear direction, the brackets 46 are formed substantially in hat shapes protruding to the upper side. The brackets 46 are spaced apart in the vehicle width direction. More specifically, flange portions 48 that extend in the vehicle width direction at lower end portions of each bracket 46 are integrally joined to the upper face of the upper reinforcement 36F by spot welding or the like.

In some embodiments, at least three of the brackets 46 are provided, at a vehicle width direction central portion and both of vehicle width direction end portions of the upper reinforcement 36F. A circular penetrating hole 47A is formed in an upper wall 47 of each bracket 46. Circular penetrating holes 44A are formed at the plural number (at least three) of predetermined positions of the support portion 44 of the sub-roof 40 that extends in the vehicle width direction. The penetrating holes 44A are in communication with the penetrating holes 47A.

Accordingly, the support portion 44 of the sub-roof 40 is attached to the upper reinforcement 36F via the brackets 46, by the shaft portions 64 of a plural number (at least three) of the rivets 60 being inserted into the penetrating holes 44A and penetrating holes 47A from the vehicle upper side and being crimped (being deformed from the shape depicted with virtual lines to the shape depicted with solid lines). Thus, the rear end portion of the sub-roof 40 is supported by the roof reinforcement 30F at the front side via the bracket 46.

A front-and-rear direction substantially central portion of the upper reinforcement 36F of the roof reinforcement 30F at the front side serves as a single second joined portion to which a second joining portion 58, which is described below, is joined. An upper face of the front-and-rear direction substantially central portion of the upper reinforcement 36F serves as a single second joined portion that a second adhesive G2, which is described below, contacts.

As shown in FIG. 2 and FIG. 3, each main roof 50 according to the present exemplary embodiment includes an outer layer 52 in a substantially rectangular flat plate shape and an inner layer 56. The inner layer 56 is integrally joined to the lower face of a predetermined region of the outer layer 52 that excludes a peripheral edge portion 52A of the outer layer 52. Together with the sub-roofs 40, the outer layers 52 structure the roof panel of the roof 12. The main roofs 50 at front and rear have similar structures. Accordingly, only the main roof 50 at the front side is described below.

The outer layer 52 is formed of a resin material featuring weather resistance such as, for example, acrylonitrile ethylene-propylene-diene styrene (AES) or the like. A plate thickness of the outer layer 52 is set from 1.0 mm to 2.5 mm. The inner layer 56 is structured by a molded body that is molded of a foam resin material (for example, expanded urethane foam or the like). The inner layer 56 is formed to be thicker than the outer layer 52. More specifically, the plate thickness of the inner layer 56 differs according to position in the front-and-rear direction and is set to at least 10 mm.

Thus, because each main roof 50 includes the outer layer 52 fabricated of resin and the inner layer 56 fabricated of resin, and each sub-roof 40 is also fabricated of resin, the main roofs 50 and the sub-roofs 40 serve as a resin roof 10. Each outer layer 52 is molded of a resin material (AES) that is harder and denser than the inner layer 56, and the outer layer 52 has a lower coefficient of thermal expansion then the inner layer 56 (the coefficient of thermal expansion of the inner layers 56 is lower than that of the outer layers 52). The sub-roofs 40 are molded of a resin material (GFRP) that is harder than the outer layers 52.

The first adhesive G1 is provided in an annular shape at the lower face of the peripheral edge portion 52A of each outer layer 52. A region in which the first adhesive G1 is provided serves as the first joining portion 54. As shown in FIG. 3, the first joining portion 54 at the front side is joined via the first adhesive G1 to head portions 62 of the rivets 60 of the sub-roof 40 and to the support portion 44 (the upper face 44U) including peripheries of the head portions 62.

As shown in FIG. 2, the first joining portion 54 at the right side is joined via the first adhesive G1 to the head portions 62 of the rivets 60 of the side member outer 14 and to the support portion 18 (an upper face 18U) including peripheries of the head portions 62. The same applies to the first joining portion 54 at the left side. Although not shown in the drawings, the first joining portion 54 at the rear side is joined via the first adhesive G1 to an upper reinforcement of the roof reinforcement 30C at the middle side.

As shown in FIG. 2 and FIG. 3, the second adhesive G2 is provided in an annular shape at outer periphery portions of the lower face of the inner layer 56. A region in which the second adhesive G2 is provided serves as the second joining portion 58. As shown in FIG. 3, the second joining portion 58 at the front side is joined via the second adhesive G2 to a front-and-rear direction substantially central portion of the upper reinforcement 36F of the roof reinforcement 30F.

As shown in FIG. 2, the second joining portion 58 at the right side is joined via the second adhesive G2 to the flange portion 28 at the vehicle width direction inner side of the roof side rail 20. The same applies to the second joining portion 58 at the left side. Although not shown in the drawings, the second joining portion 58 at the rear side is joined via the second adhesive G2 to a flange portion formed at a front end portion of the upper reinforcement of the roof reinforcement 30C at the middle side.

As shown in FIG. 2 and FIG. 3, a protruding portion 57 is integrally formed in an annular shape at the lower face of the inner layer 56, at the inner side of the second adhesive G2. The protruding portion 57 protrudes by a predetermined height toward the lower side. That is, by the protruding portion 57 is formed with a height to abut against the upper face of the upper reinforcement 36F of the roof reinforcement 30F at the front side, upper faces of the flange portions 28 at the left and right roof side rails 20, and an upper face of the flange portion (not shown in the drawings) of the upper reinforcement of the roof reinforcement 30C at the middle side.

That is, the inner layer 56 is supported by the protruding portion 57 at the roof reinforcement 30F at the front side, the left and right roof side rails 20 and the roof reinforcement 30C at the middle side. In addition, a thickness D2 of the second adhesive G2 is regulated by the protruding portion 57 to be constant along the whole periphery. More specifically, the thickness D2 of the second adhesive G2 is set by the height of the protruding portion 57 so as to be equal to or greater than a thickness D1 of the first adhesive G1 (D2≥D1). Thus, adaptability of the second adhesive G2 is greater than adaptability of the first adhesive G1.

Figure 4:
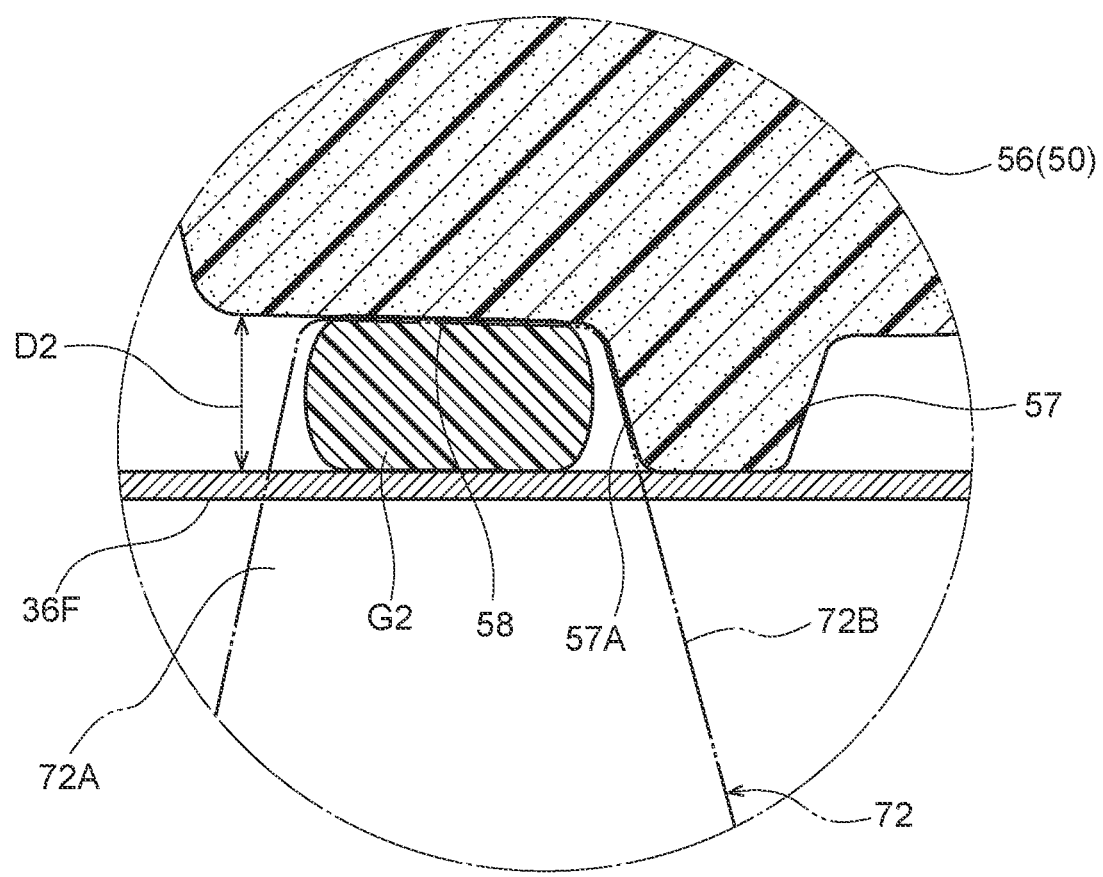
FIG. 4 is a partial magnified sectional diagram of FIG. 3 illustrating a method of providing a second adhesive at an inner layer of the resin roof according to the present exemplary embodiment.

The protruding portion 57 protrudes substantially in a rounded trapezoid shape in cross section with an outer diameter thereof decreasing from the upper side toward the lower side. As shown in FIG. 4, an outer periphery face of the protruding portion 57 serves as a guide face 57A for a nozzle 72 that supplies the second adhesive G2. That is, a distal end portion 72A of the nozzle 72 is formed substantially in a truncated cone shape with an outer diameter decreasing toward the distal end thereof. When the distal end portion 72A is providing the second adhesive G2 at the lower face of the inner layer 56, an outer periphery face 72B of the distal end portion 72A of the nozzle 72 is guided by (slides against) the guide face 57A of the protruding portion 57 while the distal end portion 72A of the nozzle 72 moves along the protruding portion 57 in the peripheral direction.

Therefore, positions of the second adhesive G2 provided at the lower face of the inner layer 56 are fundamentally set and the second adhesive G2 may be applied to these positions accurately. For the first adhesive G1 provided at the lower face of the peripheral edge portion 52A of the outer layer 52, as shown in FIG. 5, a guide member 68 attached to a nozzle 70 that supplies the first adhesive G1 is employed.

That is, a ring member 66 with an annular shape is tightly fitted and fixed to a proximal portion 70C of the nozzle 70. One end portion of a rod-shaped connecting member 67 is integrally attached to an outer periphery face of the ring member 66. The connecting member 67 extends a predetermined length to the outer side (the vehicle width direction outer side in FIG. 5). The guide member 68, with a flat plate shape, is attached to the other end portion of the connecting member 67. The guide member 68 extends a predetermined length to the side of the connecting member 67 at which a distal end portion 70A of the nozzle 70 is disposed (in sectional views seen in the vehicle front-and-rear direction and the vehicle width direction, a length somewhat further than a distal end face 70B of the nozzle 70).

Accordingly, the nozzle 70 is moved in the peripheral direction along an end wall 52C of an outer edge 52B of the outer layer 52 while a wall face 68A of the guide member 68 that opposes the side thereof at which the nozzle 70 is disposed abuts against the end wall 52C. Therefore, positions of the distal end portion 70A of the nozzle 70 relative to the peripheral edge portion 52A of the outer layer 52 are fundamentally set. Thus, positions of the first adhesive G1 provided at the lower face of the peripheral edge portion 52A of the outer layer 52 are fundamentally set and the first adhesive G1 may be applied to those positions accurately.

As shown in FIG. 2 and FIG. 3, a step portion 53 is formed at the outer layer 52 between the second joining portion 58 and the first joining portion 54. In sectional views seen in the vehicle front-and-rear direction and the vehicle width direction, the step portion 53 is inflected substantially in an "S" shape. An outer side (the peripheral edge portion 52A) of the step portion 53 is lower than an inner side thereof (the predetermined region). That is, the outer layer 52 is formed in a shape in which the peripheral edge portion 52A is disposed at the lower side relative to the predetermined region at which the inner layer 56 is provided. An outer edge 56A of the inner layer 56 is disposed a little further to the outer side (the side at which the peripheral edge portion 52A is disposed) than the step portion 53.

The outer edge 52B of the peripheral edge portion 52A of the outer layer 52 is covered by a soft sealer S featuring weather resistance. That is, the outer edge 52B at the front side is sealed up by the sealer S along with a portion of an upper face of the step portion 42 of the sub-roof 40, and the outer edge 52B at the right side is sealed up by the sealer S along with a portion of an upper face of the step portion 16 of the side member outer 14. The same applies to the outer edge 52B at the left side. Although not shown in the drawings, the outer edge 52B at the rear side is sealed up by the sealer S along with a portion of the upper face of the upper reinforcement of the roof reinforcement 30C at the middle side.

Now, operation of the resin roof 10 according to the present exemplary embodiment that is structured as described above (the main roofs 50) is described.

The sub-roofs 40 are provided at the vehicle in advance. The sub-roofs 40 are provided at the vehicle front side and the vehicle rear side of the main roofs 50 and support, respectively, the front windshield glass and the rear windshield glass. The sub-roofs 40 are formed of a resin material that is harder than the outer layers 52 of the main roofs 50. Therefore, even while the vehicle may be reduced in weight, support stiffnesses for the front windshield glass and the rear windshield glass may be assured.

The main roofs 50 are disposed at the roof 12 of the vehicle at which the sub-roofs 40 have been provided beforehand. That is, the first joining portion 54 of the peripheral edge portion 52A of the outer layer 52 of each main roof 50 (the first adhesive G1) and the second joining portion 58 of the inner layer 56 (the second adhesive G2) are joined to the corresponding first joined portion (a first joined surface) and second joined portion (a second joined surface).

More specifically, the first joining portion 54 is joined via the first adhesive G1 to the upper face 44U of the support portion 44 (including the head portions 62 of the rivets 60 and the peripheries of the head portions 62), the upper faces 18U of the left and right support portions 18 (including the head portions 62 of the rivets 60 and the peripheries of the head portions 62), and the upper face of the upper reinforcement of the roof reinforcement 30C at the middle side.

Meanwhile, the second joining portion 58 is joined via the second adhesive G2 to the upper face of the upper reinforcement 36F of the roof reinforcement 30F at the front side, the upper faces of the flange portions 28 of the left and right roof side rails 20, and the upper face of the flange portion of the roof reinforcement 30C at the middle side.

The sub-roof 40 (including the support portion 44) is formed of a harder resin material than the outer layer 52 of the main roof 50. That is, the first joining portion 54 (the peripheral edge portion 52A) of the outer layer 52 is joined to the support portion 44 of the sub-roof 40 that is higher in hardness than the outer layer 52 of the main roof 50.

Therefore, when the first joining portions 54 (the peripheral edge portions 52A) of the main roofs 50 are joined to the support portions 44 of the sub-roofs 40, the first joining portions 54 (the peripheral edge portions 52A) of the main roofs 50 are stably supported by the support portions 44 of the sub-roofs 40. Thus, assembly characteristics when the main roofs 50 are being attached to the sub-roofs 40 may be improved.

The support portion 44 of the sub-roof 40 is joined via the rivets 60 and the brackets 46 to the upper reinforcement 36F of the roof reinforcement 30F, and the second joining portion 58 of the inner layer 56 is joined to the upper reinforcement 36F of the roof reinforcement 30F. Therefore, the main roof 50 disposed at the roof 12 of the vehicle may be made more stable (may be fixed in a more stable state) than if the second joining portion 58 of the inner layer 56 was not joined to the upper reinforcement 36F of the roof reinforcement 30F.

The protruding portion 57 that abuts against the second joined portion (the upper reinforcement 36F, the flange portions 28 and so forth) is formed at the lower face of the inner layer 56. Therefore, the thickness D2 of the second adhesive G2 provided in the annular shape at the second joining portion 58 of the inner layer 56 may be regulated by the protruding portion 57 to be constant in the peripheral direction.

Because the protruding portion 57 that abuts against the second joined portion (the upper reinforcement 36F, the flange portions 28 and so forth) is formed integrally with the inner layer 56 (and is fabricated of the same foam resin as the inner layer 56), there is no risk of the protruding portion 57 scratching the second joined portion. Thus, corrosion and the like of the second joined portion may be suppressed or prevented.

When the second adhesive G2 is being provided in the annular shape at the second joining portion 58, because the outer periphery face 72B that supplies the second adhesive G2 is guided along the guide face 57A of the protruding portion 57, the second adhesive G2 may be provided efficiently and accurately relative to the second joining portion 58.

The same applies when the first adhesive G1 is being provided in the annular shape at the first joining portion 54. That is, because the wall face 68A of the guide member 68 of the nozzle 70 that supplies the first adhesive G1 is guided along the end wall 52C of the outer edge 52B of the outer layer 52, the first adhesive G1 may be provided efficiently and accurately relative to the first joining portion 54.

The second adhesive G2 is higher in adaptability than the first adhesive G1. Therefore, even if, because of the difference in the coefficients of thermal expansion of the outer layer 52 and the inner layer 56, the inner layer 56 with the higher coefficient of thermal expansion thermally expands further than the outer layer 52 to the upper side and outer sides (the front-and-rear direction outer side and the vehicle width direction outer sides), this thermal expansion is not impeded by the second adhesive G2.

To describe this more specifically, the thickness D2 of the second adhesive G2 is set to be equal to or greater than the thickness D1 of the first adhesive G1 (D2≥D1). Therefore, even when the inner layer 56 moves so as to shift to the outer sides (the front-and-rear direction outer side and the vehicle width direction outer sides) relative to the outer layer 52 because of the difference in the coefficients of thermal expansion of the outer layer 52 and inner layer 56, this movement is tolerated by the second adhesive G2 more effectively than if the thickness D2 of the second adhesive G2 was less than the thickness D1 of the first adhesive G1 (D2<D1). Therefore, an occurrence of thermal strain in the main roofs 50 due to a temperature change (particularly in the outer layers 52 that form a design surface) may be suppressed effectively.

In the sectional views seen in the vehicle front-and-rear direction and the vehicle width direction, the step portion 53 is formed at the outer layer 52 between the first joining portion 54 and the second joining portion 58, and the outer edge 56A of the inner layer 56 is disposed a little further to the outer side (the side thereof at which the peripheral edge portion 52A is disposed) than the step portion 53. Therefore, even when the inner layer 56 moves so as to shift to the outer sides (the front-and-rear direction outer side and the vehicle width direction outer sides) relative to the outer layer 52 because of the difference in the coefficients of thermal expansion of the outer layer 52 and inner layer 56, this movement may be tolerated by deformation of the step portion 53 more effectively than if the step portion 53 was not formed at the outer layer 52 between the first joining portion 54 and the second joining portion 58.

To describe this more specifically, because of the formation of the step portion 53, an upper portion of the inner layer 56 that is higher than the peripheral edge portion 52A may deform, including deformation of the outer layer 52, so as to extend to the front-and-rear direction outer side and the vehicle width direction outer sides with a vicinity of a lower end portion of the step portion 53 serving as a point of inflection. Therefore, an occurrence of thermal strain in the main roofs 50 due to a temperature change (particularly in the outer layers 52 that form the design surface) may be suppressed more effectively.

Gaps between the outer edge 52B of the peripheral edge portion 52A of the outer layer 52 and, respectively, the upper face of the step portion 42 of the sub-roof 40, the upper faces of the step portions 16 of the left and right side member outers 14, and the upper face of the upper reinforcement of the roof reinforcement 30C at the middle side are sealed up by the sealer S.

That is, the sealer S is provided in an annular shape along the outer edge 52B and has a high coefficient of extension. Therefore, for example, even if the outer edge 52B thermally expands to the front side and rear side due to a difference in coefficients of linear expansion (the coefficients of thermal expansion) with a temperature change, this expansion may be adapted to. As a result, ingression of water into a vehicle cabin through, for example, gaps between the outer edge 52B and the upper face of the step portion 42 of the sub-roof 40 may be prevented.

The support portion 44 of the sub-roof 40 is joined by the rivets 60 to the brackets 46 that are integrally attached to the upper face of the upper reinforcement 36F of the roof reinforcement 30F, and the first joining portion 54 of the outer layer 52 is joined to the support portion 44 of the sub-roof 40, including the head portions 62 of these rivets 60 and the peripheries of the head portions 62.

That is, gaps between the peripheries of the head portions 62 of the rivets 60 and the upper face of the support portion 44 are filled by the first adhesive G1. As a result, ingression of water into the vehicle cabin through the penetrating holes 44A and 47A in which the shaft portions 64 of the rivets 60 are inserted may be prevented by the first adhesive G1.

Because the outer layer 52 of each main roof 50 according to the present exemplary embodiment is fabricated of resin, the vehicle may be reduced in weight compared to a structure in which the outer layer 52 is fabricated of metal. Because the inner layer 56 of each main roof 50 according to the present exemplary embodiment is a foam molded body and is formed to be thicker than the outer layer 52, intrusion of noise into the vehicle cabin may be suppressed effectively and thermal insulation effects may be improved.

Because each main roof 50 according to the present exemplary embodiment is integrally provided with the inner layer 56 at the outer layer 52 that structures a roof panel, reference parts (not shown in the drawings) that serve as reference points during assembly may be specified more easily than in a structure in which an inner layer is integrally provided at a roof headlining and attached to a roof panel.

That is, when an inner layer is integrally provided at a roof headlining and attached to a roof panel, reference parts are subject to constraint in that the reference parts must be provided at outer periphery portions to be visible. In contrast, the present exemplary embodiment is not subject to this constraint. Moreover, when a wire harness (not shown in the drawings) or the like that is routed between the roof panel and a roof headlining is to be replaced, the main roofs 50 may be detached and the wire harness replaced. Therefore, replacement costs may be lower than when a roof headlining is detached to replace a wire harness or the like.

The resin roof 10 according to the present exemplary embodiment is described above in accordance with the drawings, but the resin roof 10 according to the present exemplary embodiment is not limited by the illustrated structures; suitable design modifications may be applied within a scope not departing from the gist of the present disclosure. For example, the support portion 44 of each sub-roof 40 may be joined to the upper walls 47 of the brackets 46 by adhesive rather than the rivets 60.

Even if the protruding portion 57 is not formed at the lower face of the inner layer 56, the inner layer 56 at which the protruding portion 57 is not formed may be employed provided the thickness D2 of the second adhesive G2 may be made equal to or greater than the thickness D1 of the first adhesive G1 (D2≥D1). The relationship between the higher and lower adaptabilities of the first adhesive G1 and the second adhesive G2 is not limited to depending on specifications of thickness but may be realized by a variation in properties of the adhesives themselves or the like.

In a situation in which the outer layer 52 has a higher coefficient of thermal expansion than the inner layer 56, the adaptability of the first adhesive G1 is constituted to be higher than the adaptability of the second adhesive G2. That is, the thickness D1 of the first adhesive G1 is specified, by the protruding portion 57 or the like, to be equal to or greater than the thickness D2 of the second adhesive G2 (D1≥D2).

What is claimed is:

1. A resin roof, comprising:
   a roof main body including:
      an outer layer fabricated of resin, the outer layer structuring a roof panel of a vehicle, and
      an inner layer fabricated of resin, the inner layer being provided in a predetermined region that excludes a peripheral edge portion of the outer layer;
   a first joining portion provided at the peripheral edge portion of the outer layer, the first joining portion being joined by a first adhesive to a first joint portion that is provided at a vehicle body side first base member; and
   a second joining portion provided at the inner layer, the second joining portion being joined by a second adhesive to a second joint portion that is provided at a vehicle body side second base member,
   wherein one of the first adhesive or the second adhesive, which corresponds to whichever of the outer layer and the inner layer has a higher coefficient of thermal expansion, is configured with higher adaptability than another of the first adhesive or the second adhesive.

2. The resin roof according to claim 1, wherein a thickness of the one of the first adhesive or the second adhesive that corresponds to the whichever of the outer layer and the inner layer has a higher coefficient of thermal expansion is equal to or greater than a thickness of the other of the first adhesive or the second adhesive.

3. The resin roof according to claim 2, wherein a protrusion portion is formed at the inner layer, the protrusion portion abutting against the second joint portion.

4. The resin roof according to claim 1, wherein a step portion is formed at the outer layer between the first joining portion and the second joining portion.

5. The resin roof according to claim 1, wherein the inner layer is formed thicker than the outer layer.

6. The resin roof according to claim 1, wherein an outer edge of the peripheral edge portion of the outer layer and the first base member are sealed together.

* * * * *